(12) United States Patent
Kim

(10) Patent No.: US 10,067,368 B2
(45) Date of Patent: Sep. 4, 2018

(54) FRAME FOR DISPLAY AND DISPLAY APPARATUS COMPRISING THE SAME

(71) Applicant: LG DISPLAY CO., LTD., Seoul (KR)

(72) Inventor: TaeJin Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/297,643

(22) Filed: Oct. 19, 2016

(65) Prior Publication Data

US 2017/0123259 A1 May 4, 2017

(30) Foreign Application Priority Data

Oct. 30, 2015 (KR) .................. 10-2015-0152636

(51) Int. Cl.
*G02F 1/1333* (2006.01)

(52) U.S. Cl.
CPC .............. *G02F 1/133308* (2013.01); *G02F 2001/133317* (2013.01); *G02F 2001/133328* (2013.01)

(58) Field of Classification Search
CPC ... G02F 1/133308; G02F 2001/133317; G02F 2001/133328; G02F 1/133608; G02F 2001/133314; G02B 6/0088; G02B 6/0091; G09F 9/00
See application file for complete search history.

(56) References Cited

U.S. PATENT DOCUMENTS

| | | | | |
|---|---|---|---|---|
| 8,696,189 B2* | 4/2014 | Yu | ......................... | G02B 6/0088 362/621 |
| 8,879,022 B2* | 11/2014 | Oh | .................... | G02F 1/133308 349/58 |
| 9,046,635 B2* | 6/2015 | Bae | ........................ | G02B 6/0088 |
| 9,383,605 B2* | 7/2016 | Park | .................. | G02F 1/133605 |
| 2006/0018106 A1* | 1/2006 | Shoji | ................. | G02F 1/133308 361/829 |
| 2008/0123370 A1* | 5/2008 | Huang | .............. | G02F 1/133615 362/633 |
| 2013/0258229 A1* | 10/2013 | Kuo | .................. | G02F 1/133308 349/58 |
| 2015/0029696 A1* | 1/2015 | Ryu | .................. | G02F 1/133608 362/97.1 |
| 2017/0010499 A1* | 1/2017 | Kang | ....................... | G09F 9/00 |

* cited by examiner

*Primary Examiner* — Tracie Y Green

(74) *Attorney, Agent, or Firm* — Birch, Stewart, Kolasch & Birch, LLP

(57) ABSTRACT

Discussed is a frame for display capable of reducing a bezel width, and a display apparatus including the same, wherein the frame for display includes first to fourth frame members connected with each other so as to make a rectangular band shape, wherein each of the first to fourth frame members includes a diagonal connection surface at its end, and a restraint member prepared in the diagonal connection surface, wherein the restraint member prevents deformation in the frame members connected by the diagonal connection surfaces.

17 Claims, 11 Drawing Sheets

FRAME FOR DISPLAY AND DISPLAY APPARATUS COMPRISING THE SAME

CROSS REFERENCE TO RELATED APPLICATIONS

This application claims the priority benefit of the Korean Patent Application No. 10-2015-0152636 filed on Oct. 30, 2015, which is hereby incorporated by reference as if fully set forth herein.

BACKGROUND

Field of the Disclosure

Embodiments of the present invention relate to a display apparatus.

Discussion of the Related Art

With the advancement of an information-oriented society, a display apparatus for displaying information in bulk has been developed rapidly. Especially, a liquid crystal display (LCD) device or organic light emitting display (OLED) device, which is one of flat display devices having advantages of thin profile, lightness, and low power consumption, substitute for a cathode ray tube (CRT) manufactured in an earlier period.

Generally, in case of the LCD device, an image is displayed by the use of thin film transistor functioning as a switching element. The LCD device is widely used for display devices of notebook computer, tablet computer, smart phone, portable display device, and portable information device as well as display devices of television or monitor. The LCD device is not a self light emitting display device, whereby a backlight unit for emitting light is disposed under a liquid crystal display panel. That is, the LCD device displays an image by the use of light emitted from the backlight unit.

FIG. 1 is a schematic view illustrating a related art display apparatus.

Referring to FIG. 1, the related art display apparatus may include a display panel 10, a driving circuit 30, and a front case 50.

The display panel 10 displays a predetermined image by the use of light emitted from a backlight unit (not shown). To this end, the display panel 10 may include a lower substrate 11 and an upper substrate 13.

On the lower substrate 11, there are a plurality of gate lines and a plurality of data lines for defining a plurality of pixel regions, a thin film transistor prepared in the pixel region and connected with the gate and data lines, and a pixel electrode connected with the thin film transistor. Also, a pad portion (PP) is prepared in the periphery of one side of the lower substrate 11. The pad portion (PP) is exposed to the outside so as to be connected with a panel driver for applying signals to the plurality of gate lines and the plurality of data lines.

The upper substrate 13 is relatively smaller than the lower substrate 11. The upper substrate 13 may include a light-shielding pattern for defining an open area overlapped with each pixel region, and a color filter which is prepared in each pixel region while being corresponding to each pixel. Additionally, the upper substrate 13 may include a common electrode which is supplied with a common voltage in accordance with a liquid crystal driving method. The upper substrate 13 confronts the lower substrate 11 with a liquid crystal layer (not shown) interposed in-between, and the upper substrate 13 is bonded to the remaining portions of the lower substrate 11 except the pad portion (PP).

The driving circuit 30, which is connected with the pad portion (PP), drives each pixel. The driving circuit 30 may include a flexible circuit film 31 attached to the pad portion (PP) of the lower substrate 11, a driving integrated circuit 33 mounted on the flexible circuit film 31, and a printed circuit board 35 connected with the flexible circuit film 31.

The front case 50 covers front edges of the display panel 10 and the driving circuit 30.

Accordingly, the related art display apparatus includes the front case 50 for covering the driving circuit 30 and the pad portion (PP) exposed to the front where a viewer is positioned, whereby a bezel width (BW) is increased in the related art display apparatus.

SUMMARY

Accordingly, embodiments of the present invention are directed to a frame for display that substantially obviates one or more problems due to limitations and disadvantages of the related art, and a display apparatus comprising the same.

An aspect of embodiments of the present invention is directed to provide a frame for display which is capable of reducing a bezel width, and a display apparatus comprising the same.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a frame for display that may include first to fourth frame members connected with each other so as to make a rectangular band shape, wherein each of the first to fourth frame members includes a diagonal connection surface prepared at each of both ends, and a restraint member prepared in the diagonal connection surface, wherein the restraint member includes a restraint groove, and a restraint protrusion connected with the restraint groove.

In another aspect of embodiments of the present invention, there is provided a display apparatus that may include a panel support frame for supporting a rear edge portion of a display panel, and a rear cover for covering a rear surface of the panel support frame, wherein the panel support frame includes first to fourth frame members connected with each other so as to make a rectangular band shape, wherein each of the first to fourth frame members includes a diagonal connection surface, and a restraint member having a restraint groove and a restraint protrusion.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of embodiments of the invention and are incorporated in and constitute a part of this application, illustrate embodiment(s) of the invention and together with the description serve to explain the principle of embodiments of the invention. In the drawings.

DETAILED DESCRIPTION OF THE INVENTION

Terms disclosed in this specification should be understood as follows.

The term of a singular expression should be understood to include a multiple expression as well as the singular expression if there is no specific definition in the context. The terms such as "the first" and "the second" are used only to differentiate one element from other elements. Thus, a scope of claims is not limited by these terms. Also, it should be understood that the term such as "include" or "have" does not preclude existence or possibility of one or more features, numbers, steps, operations, elements, parts or their combinations. It should be understood that the term "at least one" includes all combinations related with any one item. For example, "at least one among a first element, a second element and a third element" may include all combinations of two or more elements selected from the first, second and third elements as well as each element of the first, second and third elements. Also, if it is mentioned that a first element is positioned "on or above" a second element, it should be understood that the first and second elements may be brought into contact with each other, or a third element may be interposed between the first and second elements.

Hereinafter, a frame for display according to the preferred embodiment of the present invention and a display apparatus comprising the same will be described in detail with reference to the accompanying drawings. Wherever possible, the same reference numbers will be used throughout the drawings to refer to the same or like parts. Also, in the following description of the present invention, if detailed description of elements or functions known in respect of the present invention is determined to make the subject matter of the present invention unnecessarily obscure, the detailed description will be omitted.

Figure 1:
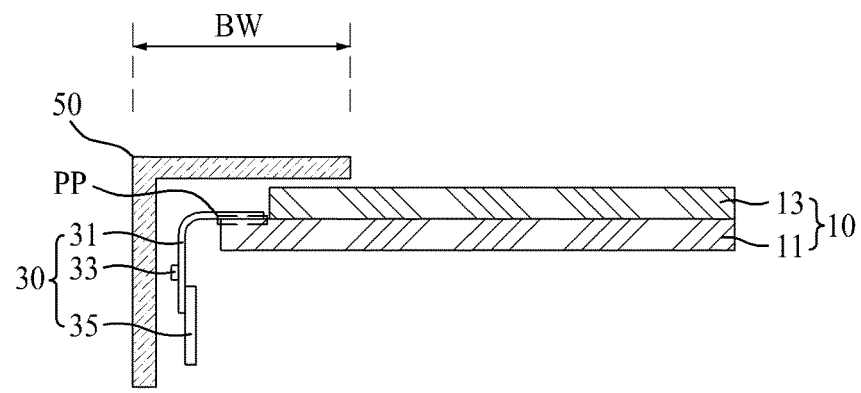
FIG. 1 is a schematic view illustrating a related art display apparatus.
Figure 2:
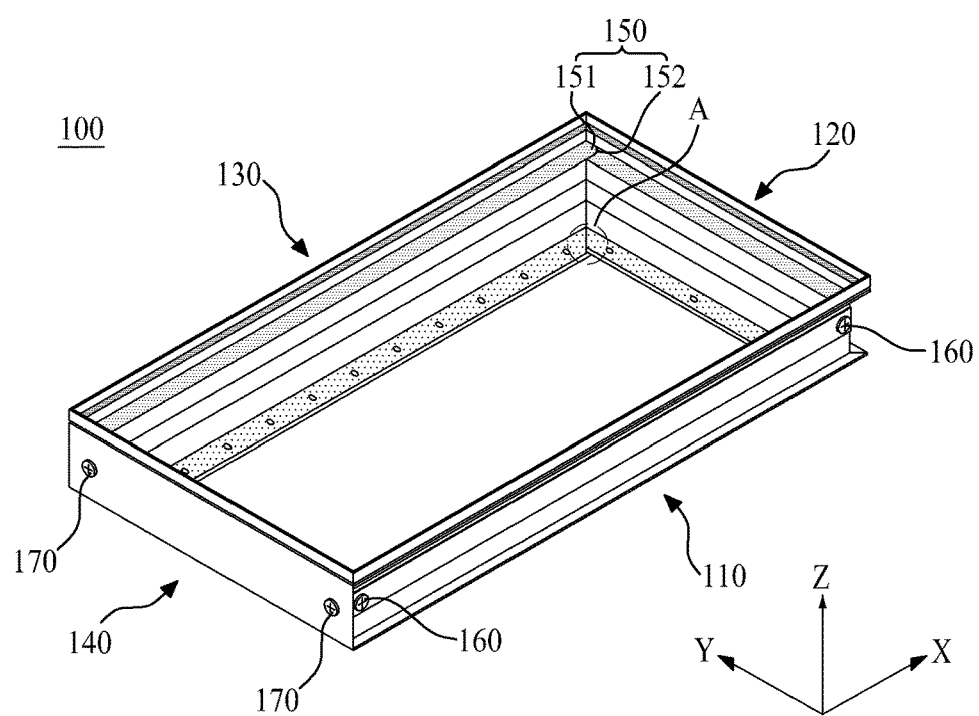
FIG. 2 is a perspective view illustrating a frame for display according to one embodiment of the present invention.
Figure 3:
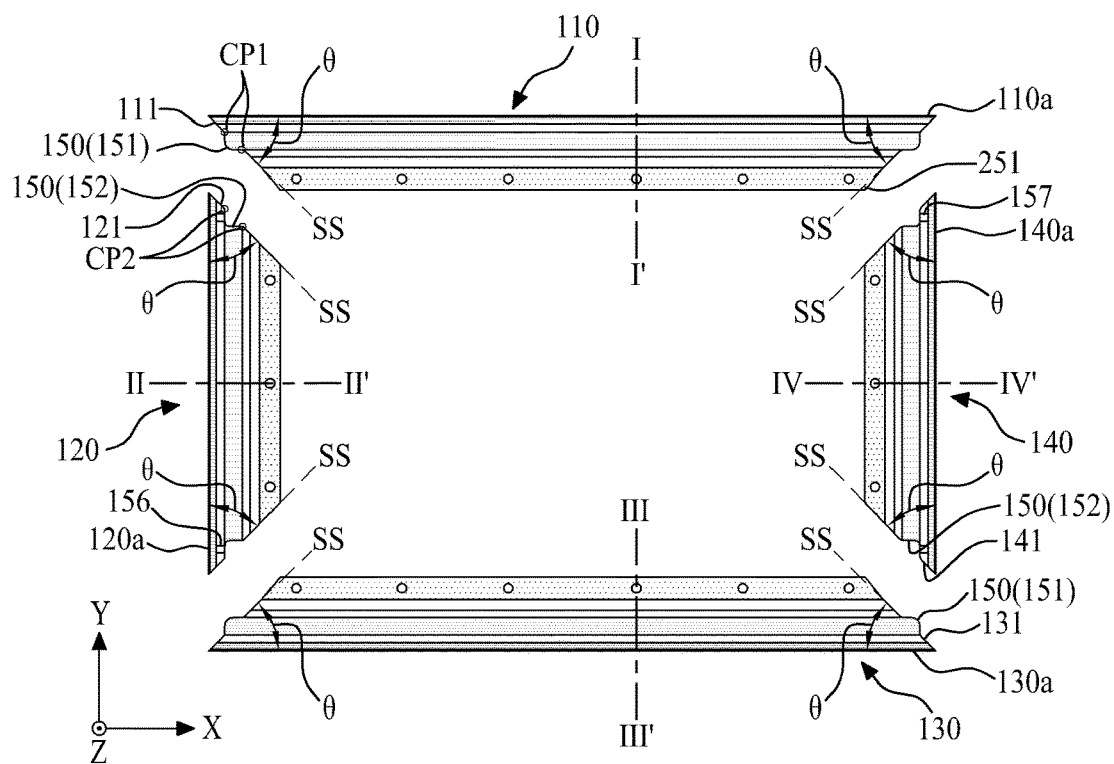
FIG. 3 is an exploded plane view illustrating the frame for display according to one embodiment of the present invention.

FIG. 2 is a perspective view illustrating a frame for display according to one embodiment of the present invention. FIG. 3 is an exploded plane view illustrating the frame for display according to one embodiment of the present invention. All the components of the frame for display according to all embodiments of the present invention are operatively coupled and configured.

Referring to FIGS. 2 and 3, the frame for display according to one embodiment of the present invention may include firs to fourth frame members 110, 120, 130, and 140 connected with each so as to form a rectangular band shape.

The first frame member 110 is disposed in parallel to a first horizontal axis direction (X). The second frame member 120 is disposed in parallel to a second horizontal axis direction (Y) being in perpendicular to the first horizontal axis direction (X) on the same plane, and is connected with one end of the first frame member 110 by a diagonal connection method. The third frame member 130 is parallel to the first frame member 110, whereby the third frame member 130 is connected with the other end of the second frame member 120 by a diagonal connection method. The fourth frame member 140 is parallel to the second frame member 120, whereby the fourth frame member 140 is connected with the other end of the third frame member 130 and the other end of the first frame member 110 by a diagonal connection method.

Each of the first to fourth frame members 110, 120, 130, and 140 according to one embodiment of the present invention may include a diagonal connection surface 111, 121, 131, and 141 prepared at each of both ends, and a restraint member 150 prepared in each diagonal connection surface 111, 121, 131, and 141.

Each diagonal connection surface 111, 121, 131, and 141 is prepared at both ends of each of the frame members 110, 120, 130, and 1410 which are cut in a diagonal-line shape. In this case, an angle (θ, hereinafter, referred to as 'diagonal angle') between an outer surface 110a, 120a, 130a, and 140a of each frame member 110, 120, 130, and 140 and the diagonal connection surface 111, 121, 131, and 141 is less than 45°. If the diagonal angle (θ) is 45° or more than 45°, a mutual interference may occur due to the increase of contact area between the neighboring diagonal connection surfaces 111, 121, 131, and 141 for the connection of the neighboring diagonal connection surfaces 111, 121, 131, and 141, thereby causing twisting or dislocating phenomenon. Meanwhile, if the diagonal angle (θ) is less than 45°, the contact area between the neighboring diagonal connection surfaces 111, 121, 131, and 141 is decreased according as it becomes distant from the outer surface 110a, 120a, 130a, and 140a of each frame member 110, 120, 130, and 140, whereby it is possible to realize a minimum point of contact between the neighboring diagonal connection surfaces 111, 121, 131, and 141, to thereby prevent twisting or dislocating phenomenon in accordance with the structural mutual interference between the frame members 110, 120, 130 and 140 on assembly of the frame.

The restraint member 150 is prepared in the diagonal connection surface 111, 121, 131, and 141 of each frame member 110, 120, 130, and 140, to thereby restrain sliding between each of the frame members 110, 120, 130, and 140 connected with each other through the use of diagonal connection surface 111, 121, 131, and 141. That is, the restraint member 150 prevents rotation twisting for the two frame members connected with each other by the diagonal connection method, and also prevents twisting and diagonal sliding in the horizontal axis direction (X, Y) for the two frame members connected with each other by the diagonal connection method. Also, the restraint member 150 maximizes perpendicularity in the two frame members connected with each other by the diagonal connection method, to thereby realize the frame 100 with a perfect rectangular band shape.

Figure 4:
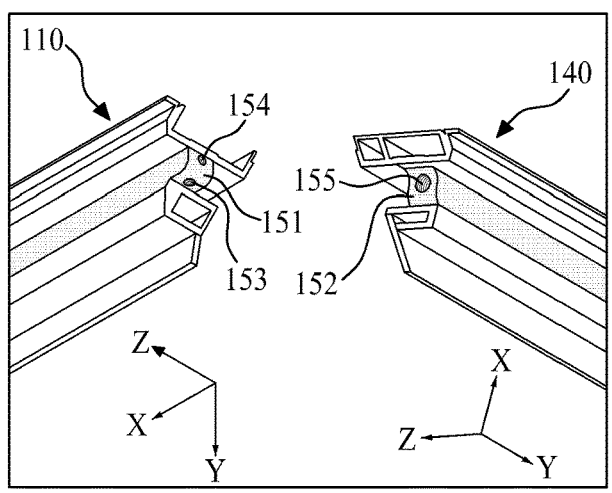
FIG. 4 illustrates first to third screw holes and a restraint member shown in FIG. 3.

As shown in FIGS. 2 to 4, the restraint member 150 according to one example may include a restraint protrusion 151 and a restraint groove 152.

The restraint protrusion 151 protrudes from the diagonal connection surface 111 and 131 of each of the first and third frame members 110 and 130 being in parallel to each other.

The restraint groove 152 is concavely prepared in the diagonal connection surface 121 and 141 of each of the second and fourth frame members 120 and 140 being in parallel to each other.

When assembling the frame, the restraint protrusion 151 is inserted into the restraint groove 152 so that it is possible to prevent twisting and diagonal sliding of the frame members connected with each other in the diagonal connection structure. For example, if the end of one side of the first frame member 110 and the end of one side of the second frame member 120 are connected with each other in the diagonal connection structure, the restraint protrusion 151 prepared in the first diagonal connection surface 111 of the first frame member 110 is inserted into the restraint groove 152 prepared in the second diagonal connection surface 121 of the second frame member 120. Accordingly, the first and second frame members 110 and 120 connected with each other by the first and second diagonal connection surfaces 111 and 121 prevent the twisting and diagonal sliding in the horizontal axis direction (X, Y) and the rotation twisting by the connection between the restraint protrusion 151 and the restraint groove 152.

A corner of each of the restraint protrusion 151 and the restraint groove 152 confronting each other may be rounded so as to realize a minimum point of contact between the diagonal connection surfaces. That is, the corner of the restraint protrusion 151 may be rounded with a first curvature, and the corner of the restraint groove 152 may be rounded with a second curvature. Thus, the respective corners of the restraint protrusion 151 and the restraint groove 152 confronting each other are spaced from each other due to the curvature difference, whereby the restraint protrusion 151 and the restraint groove 152 are connected by the minimum point of contact needed to restrain a deformation between the first and second frame members 110 and 120 on assembly of the frame.

First and second screw holes 153 and 154 are provided in the restraint protrusion 151. The first screw hole 153 is prepared in the restraint protrusion 151 of each of the first and third frame members 110 and 130 along the second horizontal axis direction (Y). The second screw hole 154 is prepared in the restraint protrusion 151 of each of the first and third frame members 110 and 130 along the first horizontal axis direction (X). A central direction of the first screw hole 153 and a central direction of the second screw hole 154 are perpendicular to each other on the same plane. That is, an angle between the central direction of the first screw hole 153 and the central direction of the second screw hole 154 is set to be 90°.

A third screw hole 155 is prepared in the restraint groove 152. The third screw hole 155 is prepared in the restraint groove 152 of each of the second and fourth frame members 120 and 140 along the second horizontal axis direction (Y).

Additionally, each corner portion between the restraint member 150 and the diagonal connection surface 111, 121, 131, and 141 is rounded with a predetermined curvature so as to realize the minimum point of contact between each of the diagonal connection surfaces 111, 121, 131, and 141. That is, the first corner portion (CP1) prepared between the diagonal connection surface 111 and 131 and the restraint protrusion 151 is rounded with a third curvature, and the second corner portion (CP2) prepared between the diagonal connection surface 121 and 141 and the restraint groove 152 is curved with a fourth curvature, wherein the fourth curvature is smaller than the third curvature.

Figure 5:
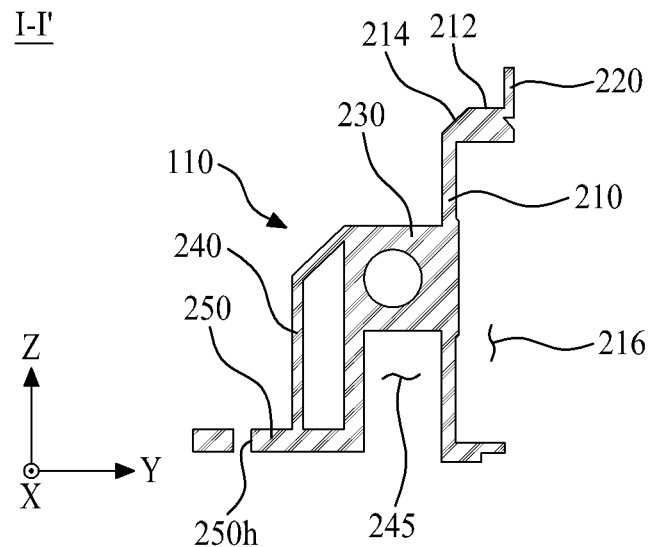
FIG. 5 is a cross sectional view along I-I' of FIG. 3, which is a cross sectional view of a first frame member.

FIG. 5 is a cross sectional view along I-I' of FIG. 3, which is a cross sectional view of the first frame member.

Referring to FIGS. 3 and 5, the first frame member 110 according to one embodiment of the present invention may include a main sidewall 210, a panel support sidewall 220, a coupling portion 230, an auxiliary sidewall 240, and a second support portion 250.

The main sidewall 210 includes a rectangular shaped cross section which is extended along the first horizontal axis direction (X). That is, the main sidewall 210 may be a bar shape whose height is larger than its width. The main sidewall 210 may include a first support portion 212 prepared on its upper surface, a chamfer 214 prepared in an upper inside corner and provided with a predetermined angle, and a circuit receiving groove 216 concavely prepared in an outside wall.

The first support portion 212 supports a diffusion plate and a reflective sheet of the display apparatus to be explained later.

The chamfer 214 guides a bending state of the reflective sheet so that the reflective sheet is supported on the first support portion 212.

The circuit receiving groove 216 receives a panel driving circuit of the display apparatus to be explained later.

Both ends of the main sidewall 210 are cut in a diagonal-line shape so as to have the diagonal angle (θ).

The panel support sidewall 220 is perpendicularly protruding so as to have a predetermined height from an edge of one side of the main sidewall 210. In this case, the height of the panel support sidewall 220 is set to be larger than a total height of reflective sheet, diffusion plate and optical sheet portion supported on the first support portion 212. The panel support sidewall 220 supports a display panel of the display apparatus to be explained later. Both ends of the panel support sidewall 220 are cut in a diagonal-line shape so as to have the diagonal angle (θ).

The coupling portion 230 is protruding from an inner surface of the main sidewall 210 which is spaced from the first support portion 212. That is, the coupling portion 230 is protruding from an inner surface between an upper surface of the main sidewall 210 and a lower surface of the main sidewall 210. The restraint protrusion of the restraint member 150 is prepared at both ends of the coupling portion 230. That is, the restraint protrusion is protruding from the both ends of the coupling portion 230 along the first horizontal axis direction (X).

The auxiliary sidewall 240 is prepared in the inner surface of the coupling portion 230 while being in parallel to the main sidewall 210. In order to reduce a weight of the frame, the auxiliary sidewall 240 may have a rectangular shape with a hollow. An upper surface of the auxiliary sidewall 240 may be an inclined surface which is inclined from an upper surface of the coupling portion 230.

A cover insertion groove 245 is prepared between a lower end of the auxiliary sidewall 240 and a lower end of the main sidewall 210. A cover sidewall of a rear cover (not shown) of the display apparatus, to be explained later, is inserted into the cover insertion groove 245, whereby the frame member is supported by the rear cover. Both ends of the auxiliary sidewall 240 are cut in a diagonal-line shape so as to have the diagonal angle (θ).

The second support portion 250 is protruding so as to have a predetermined length from the inner surface of the auxiliary sidewall 240. The second support portion 250 is connected with the rear cover of the display apparatus. The second support portion 250 includes a plurality of through holes 250h through which a plurality of frame fixing members pass so as to connect the frame member and the rear cover with each other. Both ends of the second support portion 250 are cut in a diagonal-line shape so as to have the diagonal angle (θ), wherein each corner portion 251 of the both ends is protruding out of an extending line (SS) of the diagonal angle (θ).

Figure 6:
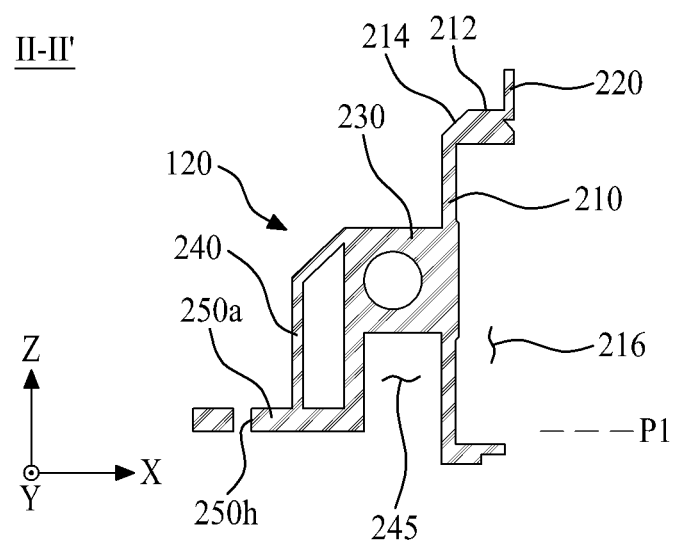
FIG. 6 is a cross sectional view along II-II' of FIG. 3, which is a cross sectional view of a second frame member.

FIG. 6 is a cross sectional view along II-II' of FIG. 3, which is a cross sectional view of the second frame member.

Referring to FIGS. 3 and 6, the second frame member 120 according to one embodiment of the present invention may include a main sidewall 210, a panel support sidewall 220, a coupling portion 230, an auxiliary sidewall 240, and a second support portion 250a. Except the second support portion 250a, the other elements 210, 220, 230, and 240 of the second frame member 120 are the same as those of the first frame member 110 shown in FIG. 5, whereby the same reference numbers will be used throughout the drawings to refer to the same parts, and a detailed description for the same parts will be omitted.

The second support portion 250a of the second frame member 120 is protruding so as to have a predetermined length from the inner surface of the auxiliary sidewall 240. In this case, the second support portion 250a is prepared at a position (P1) which corresponds to a height of the second support portion 250 prepared in the first frame member 110.

The second support portion 250a is connected with the rear cover of the display apparatus. The second support portion 250a includes a plurality of through holes 250h through which a plurality of frame fixing members (not shown) pass so as to connect the frame member and the rear cover with each other. Both ends of the second support portion 250a are cut in a diagonal-line shape so as to have the diagonal angle (θ). In this case, each corner portion of the both ends of the second support portion 250a is cut in a diagonal-line shape while being corresponding to an extending line (SS) of the diagonal angle (θ), wherein each corner portion of the both ends is not protruding out of the extending line (SS) of the diagonal angle (θ).

Accordingly, when assembling the frame, the second support portion 250a of the second frame member 120 is overlapped with the second support portion 250 of the first frame member 110 so that twisting occurring in the second frame member 120 by a force in a vertical axis direction (Z) is restrained by the second support portion 250 of the first frame member 110. In the same manner, twisting occurring in the first frame member 110 by a force in a vertical axis direction (Z) is restrained by the second support portion 250a of the second frame member 120. Eventually, in case of the first and second frame members 110 and 120 connected by the diagonal connection structure, twisting by a force of the horizontal axis direction (X, Y) is restrained by the restraint member 150, and twisting by a force of the vertical axis direction (Z) is restrained by the overlap structure of the second support portion 250 and 250a, whereby one side of the first frame member 110 and one side of the second frame member 120 are connected with each other in the maximum perpendicular structure.

Additionally, a first communication hole 156 being in communication with the second screw hole 154 prepared in the restraint protrusion 151 of each of the first and third frame members 110 and 130 is prepared at both ends of the main sidewall 210 prepared in the second frame member 120.

Figure 7:
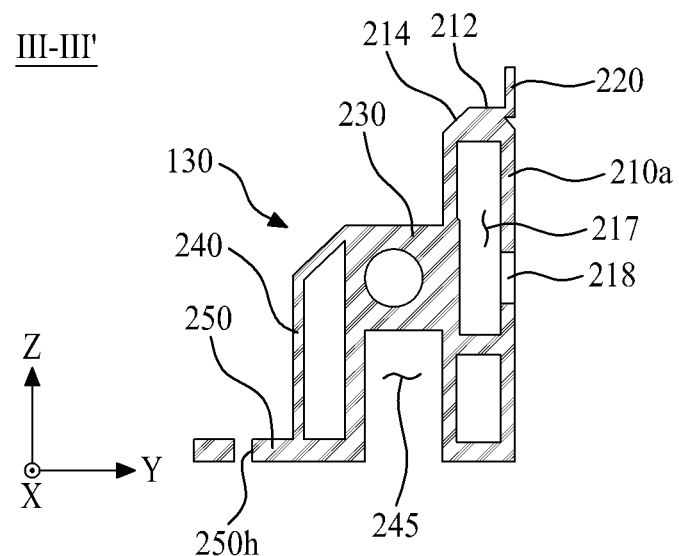
FIG. 7 is a cross sectional view along III-III of FIG. 3, which is a cross sectional view of a third frame member.

FIG. 7 is a cross sectional view along III-III' of FIG. 3, which is a cross sectional view of the third frame member.

Referring to FIGS. 3 and 7, the third frame member 130 according to one embodiment of the present invention may include a main sidewall 210a, a panel support sidewall 220, a coupling portion 230, an auxiliary sidewall 240, and a second support portion 250. Except the main sidewall 210a, the other elements 220, 230, 240, and 250 of the third frame member 130 are the same as those of the first frame member 110 shown in FIG. 5, whereby the same reference numbers will be used throughout the drawings to refer to the same parts, and a detailed description for the same parts will be omitted.

In the third frame member 130, the main sidewall 210a includes a rectangular shaped cross section which is extended along the second horizontal axis direction (Y). That is, the main sidewall 210a may be a bar shape whose height is larger than its width. The main sidewall 210a may include a first support portion 212 prepared on its upper surface, a chamfer 214 prepared in an upper inside corner and provided with a predetermined angle, and an inner hollow 217. Both ends of the main sidewall 210a are cut in a diagonal-line shape so as to have the diagonal angle (θ).

The first support portion 212 supports a diffusion plate and a reflective sheet of the display apparatus to be explained later.

The chamfer 214 guides a bending state of the reflective sheet so that the reflective sheet is supported on the first support portion 212.

In order to reduce a weight of the main sidewall 210a, the inner hollow 217 penetrates through the inside of the main sidewall 210a along the first horizontal axis direction (X).

An outer lateral surface of the main sidewall 210a has a plane surface structure. In the outer lateral surface of the main sidewall 210a, there is a screw through hole 218 which is overlapped with a first screw hole.

As shown in 'A' of FIG. 2, when assembling the frame, the second support portion 250 of the third frame member 130 is overlapped with the second support portion 250a of the second frame member 120, whereby twisting occurring in the third frame member 130 by a force of the vertical axis direction (Z) may be restrained by the second support portion 250a of the second frame member 120. In the same manner, twisting occurring in the second frame member 120 by a force of the vertical axis direction (Z) may be restrained by the second support portion 250 of the third frame member 130. Eventually, in case of the second and third frame members 120 and 130 connected by the diagonal connection structure, twisting by a force of the horizontal axis direction (X, Y) is restrained by the restraint member 150, and twisting by a force of the vertical axis direction (Z) is restrained by the overlap structure of the second support portion 250 and 250a, whereby the other side of the second frame member 120 and one side of the third frame member 130 are connected with each other in the maximum perpendicular structure.

Figure 8:
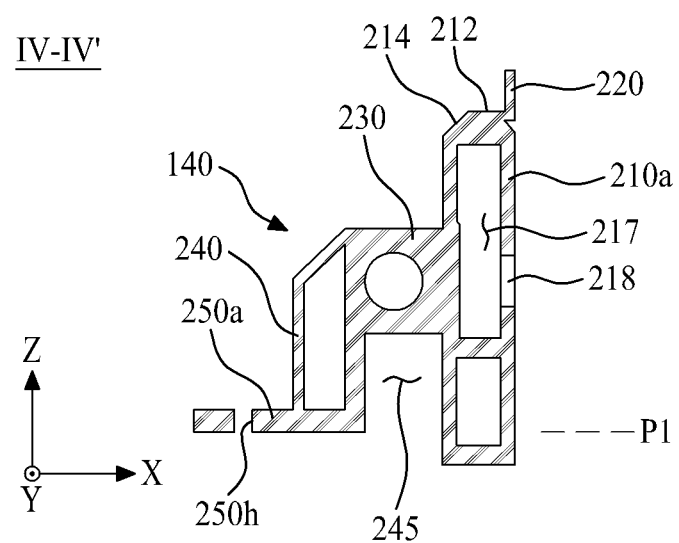
FIG. 8 is a cross sectional view along IV-IV' of FIG. 3, which is a cross sectional view of a fourth frame member.

FIG. 8 is a cross sectional view along IV-IV' of FIG. 3, which is a cross sectional view of the fourth frame member.

Referring to FIGS. 3 and 8, the fourth frame member 140 according to one embodiment of the present invention may include a main sidewall 210a, a panel support sidewall 220, a coupling portion 230, an auxiliary sidewall 240, and a second support portion 250a. Except the second support portion 250a, the other elements 210a, 220, 230, and 240 of the fourth frame member 140 are the same as those of the third frame member 130 shown in FIG. 7, whereby the same reference numbers will be used throughout the drawings to refer to the same parts, and a detailed description for the same parts will be omitted.

The second support portion 250a of the fourth frame member 140 is the same as the second support portion 250a of the second frame member 120 shown in FIG. 6, whereby the same reference number is used, and a detailed description for the second support portion 250a of the fourth frame member 140 will be omitted.

When assembling the frame, the second support portion 250a of the fourth frame member 140 is overlapped with the second support portion 250a of each of the first and third frame members 110 and 130, whereby twisting occurring in the fourth frame member 140 by a force of the vertical axis direction (Z) is restrained by the second support portion 250 of each of the first and third frame members 110 and 130. In the same manner, twisting occurring in each of the first and third frame members 110 and 130 by a force of the vertical axis direction (Z) is restrained by the second support portion 250a of the fourth frame member 140. Eventually, in case of the first, third, and fourth frame members 110, 130, and 140 connected by the diagonal connection structure, twisting by a force of the horizontal axis direction (X, Y) is restrained by the restraint member 150, and twisting by a force of the vertical axis direction (Z) is restrained by the overlap structure of the second support portion 250 and 250a, whereby the other side of the third frame member 130 and one side of the fourth frame member 140 are connected with each other in the maximum perpendicular structure, and the other side of the first frame member 110 and the other side of the fourth frame member 140 are also connected with each other in the maximum perpendicular structure.

Additionally, a second communication hole 157 being in communication with the second screw hole 154 prepared in the restraint protrusion 151 of each of the first and third frame members 110 and 130 is prepared at both ends of the main sidewall 210a prepared in the fourth frame member 140.

Figure 9:
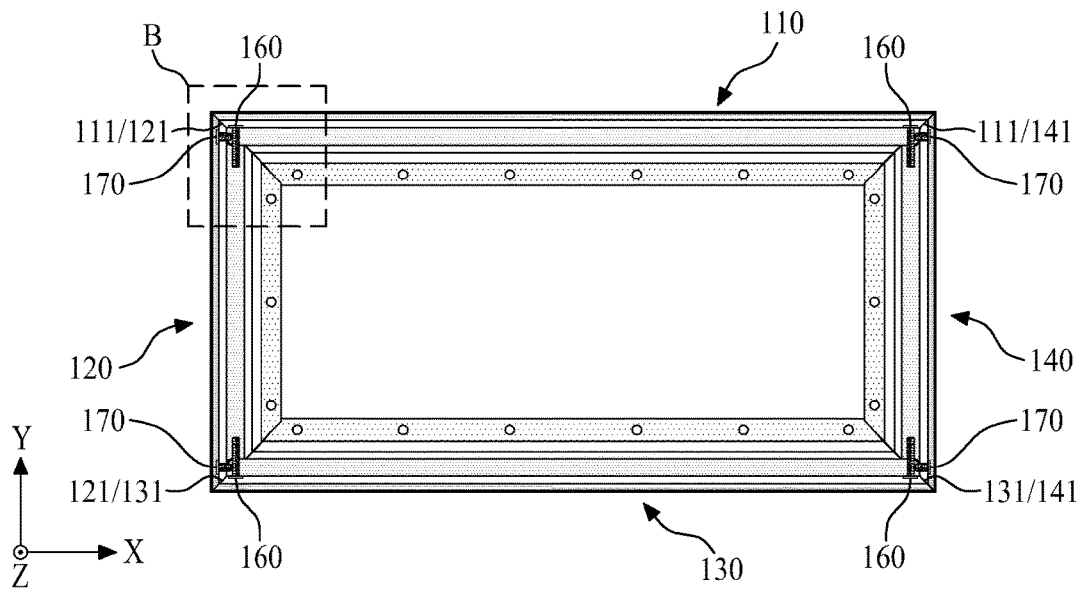
FIG. 9 is a plane view illustrating a connection structure of the frame for display according to one embodiment of the present invention.
Figure 10:
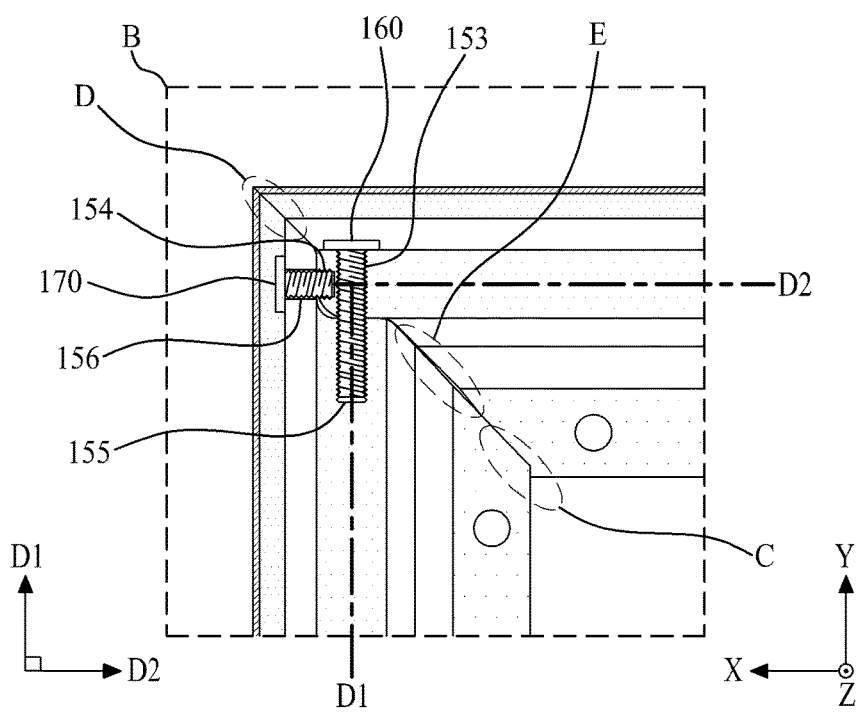
FIG. 10 is an enlarged view showing 'B' of FIG. 9.

FIG. 9 is a plane view illustrating the connection structure of the frame for display according to one embodiment of the present invention, and FIG. 10 is an enlarged view showing 'B' of FIG. 9.

The connection structure of the frame for display according to one embodiment of the present invention will be described with reference to FIGS. 3, 4, 9, and 10.

First, the left upper corner portion of the frame for display has the perpendicular shape according as the diagonal connection surface 111 of one side of the first frame member 110 and the diagonal connection surface 121 of one side of the second frame member 120 are connected in the diagonal connection structure by the first and second connection members 160 and 170. In this case, the first connection member 160 is coupled with the first screw hole 153 prepared in the first frame member 110, and is then coupled with the third screw hole 155 prepared in the second frame member 120, and the second connection member 170 is coupled with the second screw hole 154 prepared in the restraint protrusion 151 of the first frame member 110 through the first communication hole 156 prepared in the second frame member 120. In this case, a coupling axis direction (D1) of the first connection member 160 is parallel to the second horizontal axis direction (Y), and a coupling axis direction (D2) of the second connection member 170 is parallel to the first horizontal axis direction (X), whereby the coupling axis direction (D1) of the first connection member 160 is perpendicular to the coupling axis direction (D2) of the second connection member 170, and thus, a displacement to the vertical axis direction (Z) for the first and second connection members 160 and 170 becomes '0' (zero).

When assembling the first and second frame members 110 and 120, as shown in 'C' of FIG. 10, the corner portion of the end of one side in the second support portion of the second frame member 120 is overlapped with the second support portion of the first frame member 110. As shown in 'D' and 'E' of FIG. 10, the point of contact area between the diagonal connection surfaces 111 and 121 is minimized by the diagonal angle (θ) of the diagonal connection surfaces 111 and 121. The restraint protrusion 151 of the first frame member 110 is connected with the restraint groove 152 of the second frame member 120, and the first and second connection member 160 and 170 are crossing each other on the same plane. Accordingly, the diagonal connection surface 111 of one side of the first frame member 110 and the diagonal connection surface 121 of one side of the second frame member 120 are connected with each other in the perpendicular structure without vertical and horizontal twisting.

In the same manner, the left lower corner portion of the frame for display has the perpendicular shape according as the diagonal connection surface 121 of the other side of the second frame member 120 and the diagonal connection surface 131 of one side of the third frame member 130 are connected in the diagonal connection structure by the first and second connection members 160 and 170 under the condition that the corner portion of the end of the other side in the second support portion of the second frame member 120 is overlapped with the second support portion of the third frame member 130. Also, the right lower corner portion of the frame for display has the perpendicular shape according as the diagonal connection surface 141 of one side of the fourth frame member 140 and the diagonal connection surface 131 of the other side of the third frame member 130 are connected in the diagonal connection structure by the first and second connection members 160 and 170 under the condition that the corner portion of the end of one side in the second support portion of the fourth frame member 140 is overlapped with the second support portion of the third frame member 130. Also, the right upper corner portion of the frame for display has the perpendicular shape according as the diagonal connection surface 111 of the other side of the first frame member 110 and the diagonal connection surface 141 of the other side of the fourth frame member 140 are connected in the diagonal connection structure by the first and second connection members 160 and 170 under the condition that the corner portion of the end of the other side in the second support portion of the fourth frame member 140 is overlapped with the second support portion of the first frame member 110.

In the frame 100 for display according to one embodiment of the present invention, the first to fourth frame members 110, 120, 130, and 140 are connected in the diagonal connection structure through the use of diagonal connection surfaces 111, 121, 131, and 141 prepared at both ends of each of the first to fourth frame members 110, 120, 130, and 140, so that it is possible to realize the stable rectangular shape. In addition, it is possible to minimize the deformation on assembly by at least one of the restraint member 150 prepared in the diagonal connection surface 111, 121, 131, and 141, the overlap structure between each of the first to fourth frame members 110, 120, 130, and 140, and the crossing structure between the first and second connection members 160 and 170 on the same plane.

Figure 11:
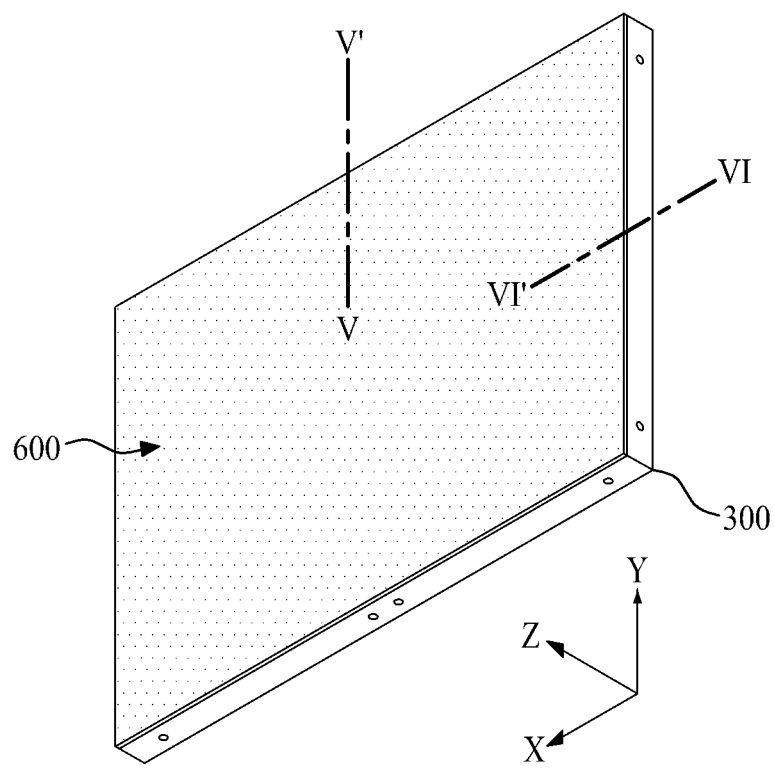
FIG. 11 is a perspective view illustrating a display apparatus according to one embodiment of the present invention.
Figure 12:
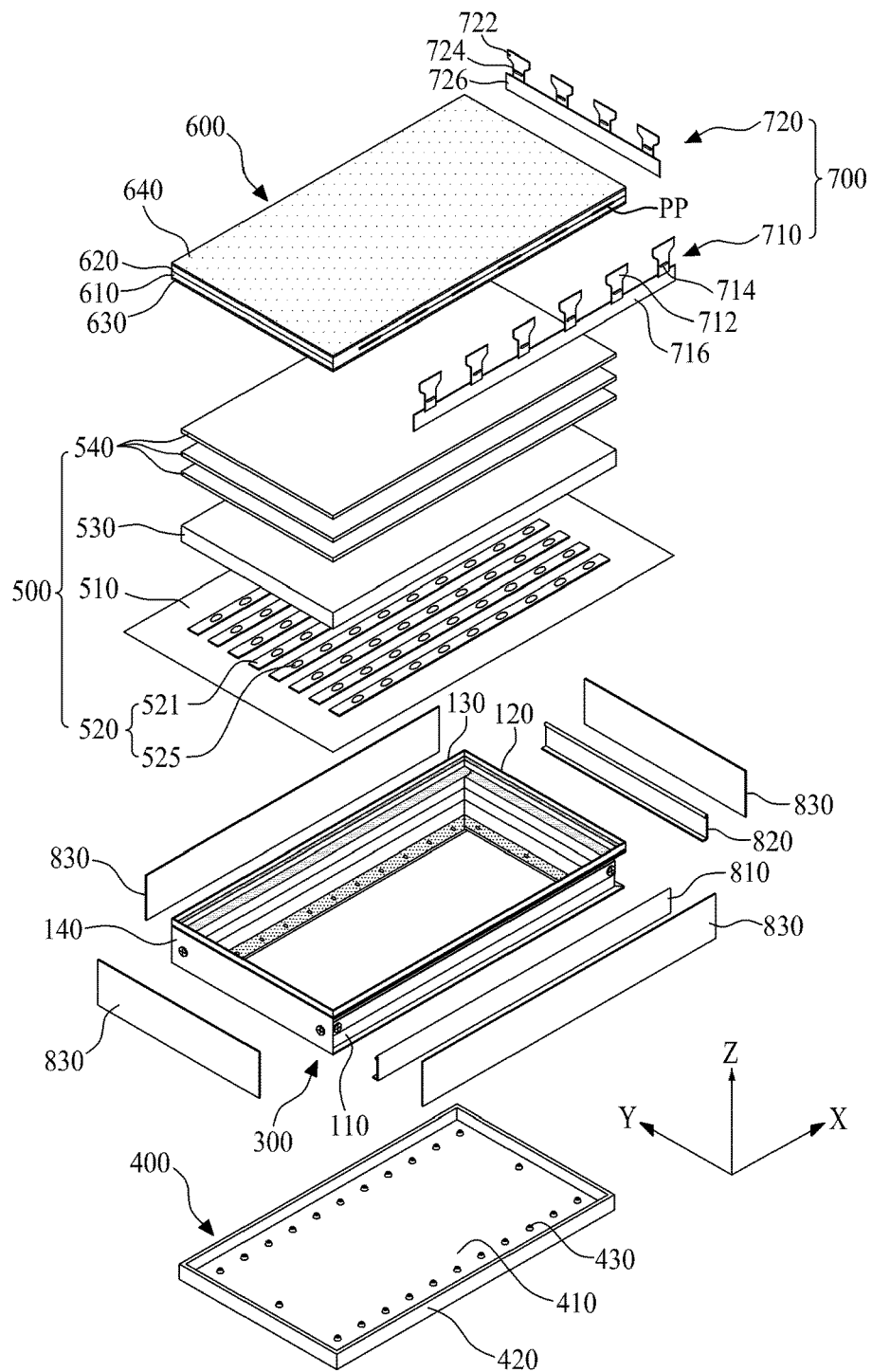
FIG. 12 is an exploded perspective view illustrating the display apparatus according to one embodiment of the present invention.
Figure 13:
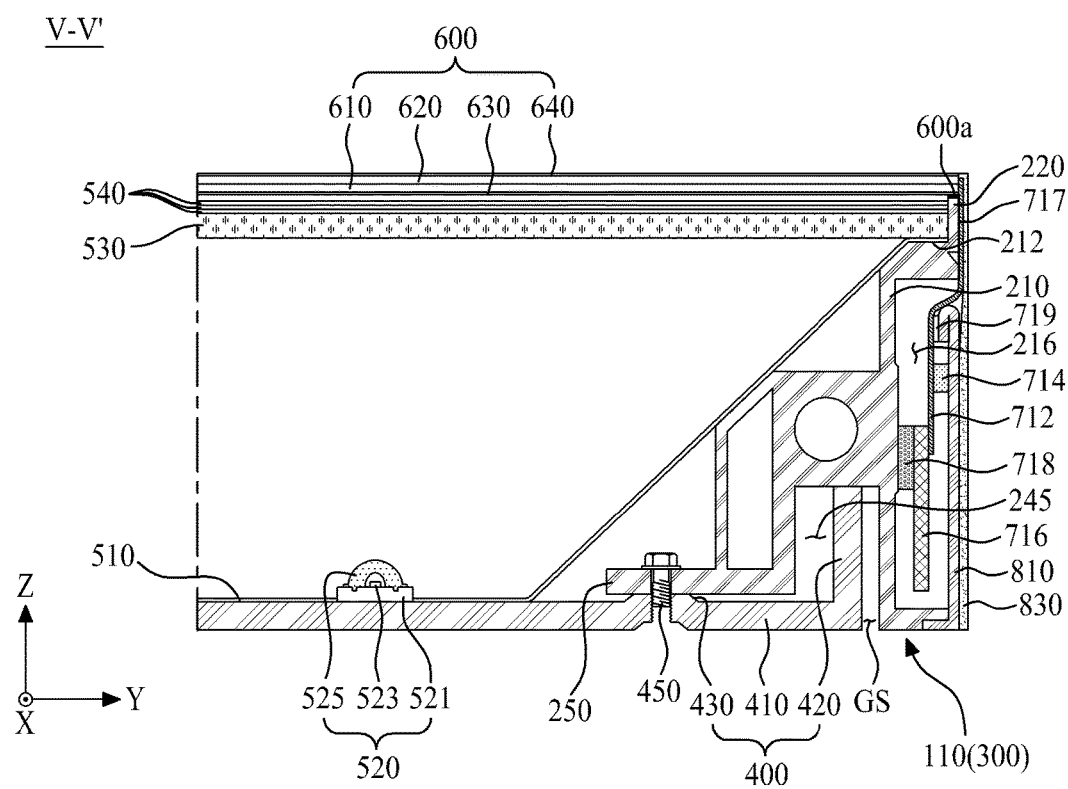
FIG. 13 is a cross sectional view along V-V' of FIG. 11.
Figure 14:
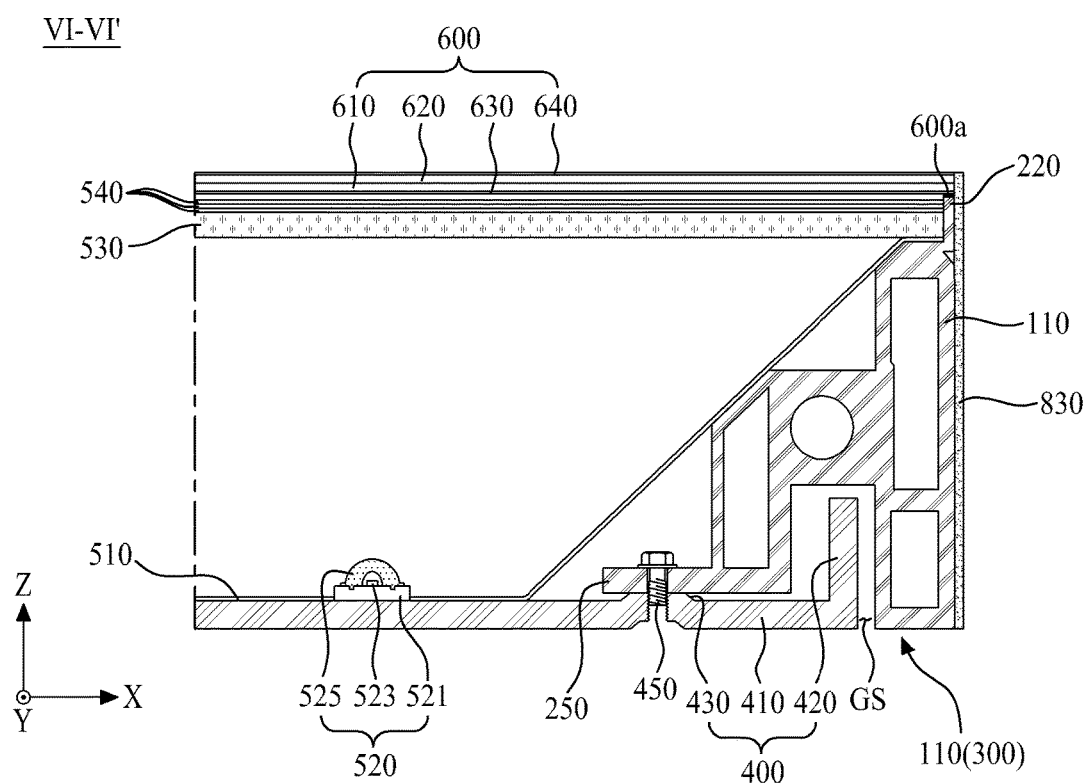
FIG. 14 is a cross sectional view along VI-VI' of FIG. 11.

FIG. 11 is a perspective view illustrating a display apparatus according to one embodiment of the present invention, FIG. 12 is an exploded perspective view illustrating the display apparatus according to one embodiment of the present invention, FIG. 13 is a cross sectional view along V-V' of FIG. 11, and FIG. 14 is a cross sectional view along VI-VI' of FIG. 11.

Referring to FIGS. 11 to 14, the display apparatus according to one embodiment of the present invention may include a panel support frame 300, a rear cover 400, a backlight unit 500, a display panel 600, and a panel driving circuit portion 700.

The panel support frame 300 includes first to fourth frame members 110, 120, 130, and 140 connected with each other so as to have a rectangular band shape. The structure of the panel support frame 300 is the same as the frame 100 for display shown in FIGS. 2 to 10, whereby a detailed description for the panel support frame 300 will be omitted.

The rear cover 400 is prepared to cover a rear surface of the panel support frame 300. The rear cover 400 according to one example may include a cover plate 410, a cover sidewall 420, and a plurality of protrusions 430.

The cover plate 410 may have a flat-plate shape for covering the rear surface of the panel support frame 300.

The cover sidewall 420 is connected with an end of an edge of the cover plate 410, and is then inserted into a cover insertion groove 245 of the panel support frame 300. In this case, a predetermined gap space (GS) is prepared between the cover sidewall 420 and a main sidewall 210 of the panel support frame 300. The gap space (GS) provides a space enabling a smooth thermal expansion of the rear cover 400. That is, the gap space (GS) may be defined by an expansion gap of the rear cover 400.

Each of the plurality of protrusions 430 protrudes from the cover plate 410, and supports the second support portion 250 of the panel support frame 300. A connection hole is prepared in each of the plurality of protrusions 430. The connection hole is coupled with a screw 450 passing through a vertical through hole 250h prepared in the second support portion 250 of the panel support frame 300.

As the rear cover 400 is connected with the second support portion 250 of the panel support frame 300 by the plurality of screws 450, the rear cover 400 covers the rear surface of the panel support frame 300, and also supports the backlight unit 500.

The backlight unit 500 is disposed between the rear cover 400 and the panel support frame 300, wherein the backlight unit 500 emits light toward the display panel 600. The backlight unit 500 according to one example may include a reflective sheet 510, a plurality of light source array modules 520, a diffusion plate 530, and an optical sheet portion 540.

The reflective sheet 510 is disposed in an inner inclined surface of the panel support frame 300 and the cover plate 410 of the rear cover 400. In this case, an edge portion of the reflective sheet 510 is supported by the first support portion 212 of the panel support frame 300. The reflective sheet 510 reflects light, which advances toward the rear cover 400 and the panel support frame 300, to the diffusion plate 530, to thereby minimize light loss.

The plurality of light source array modules 520 are provided at fixed intervals in the cover plate 410 of the rear cover 400, to thereby emit light to the diffusion sheet 530. Each of the plurality of light source array modules 520 according to one example may include a printed circuit board for light source 521, plural point source packages 523, and plural optical lenses 525.

The plurality of printed circuit boards for light source 521 are provided at fixed intervals in the cover plate 410 of the rear cover 400 or the reflective sheet 510. A light source power line and a connector are mounted on the printed circuit board for light source 521, wherein the printed circuit board for light source 521 is connected with an external backlight driving circuit through a connector.

The plural point source packages 523 are provided at fixed intervals on the printed circuit board for light source 521, and are electrically connected with the light source power line, whereby the plurality of point source packages 523 are driven to emit light by light source driving power supplied via the light source power line. Each of the plurality of point source packages 523 may include a light emitting diode driving chip.

The plural optical lenses 525 are mounted on the printed circuit board for light source 521 so as to individually cover the plural point source packages 523. The optical lens 525 diffuses the light emitted from the point source packages 523 so that it is possible to prevent a hot spot by diffusing luminance in the center of each point source package 523, and to increase a light emission area. For example, the optical lens 525 may have a hemispherical cross section, that is, a hemispherical cross section whose center is recessed, but not limited to this shape. The optical lens 525 may have any shape capable of diffusing light.

The diffusion plate 530 is disposed in the first support portion 212 of the panel support frame 300 so as to cover the plurality of light source array modules 520. The diffusion plate 530 diffuses incident light, which is emitted from the light source array module 520, to the entire areas of the display panel 600. To this end, the diffusion plate 530 may include a light-scattering material or a light-scattering pattern.

The optical sheet portion 540 is disposed on the diffusion plate 530, wherein the optical sheet portion 540 enhances the luminance properties of incident light from the diffusion plate 530. For example, the optical sheet portion 540 may include a diffusion sheet, a prism sheet, and a dual brightness enhancement film, but not limited to this structure. The optical sheet portion 540 may be formed in a deposition structure including at least two selected among a diffusion sheet, a prism sheet, a dual brightness enhancement film, and a lenticular sheet.

The display panel 600 displays a predetermined color image, by the use of light which is emitted from the backlight unit 500. The light passes through the liquid crystal layer. The liquid crystal layer is driven by an electric field formed every pixel by a common voltage and a data voltage applied to each pixel. The display panel 600 according to one example is connected with the panel support sidewall 220 prepared in each frame member 110, 120, 130, and 140 of the panel support frame 300 by the use of panel adhesive 600a. The display panel 600 according to one example may include a lower substrate 610, an upper substrate 620, a lower polarizing member 630, and an upper polarizing member 640.

The lower substrate 610 may include a plurality of pixels formed every region defined by crossing a plurality of gate lines and a plurality of data lines. Each pixel may include a thin film transistor connected with the gate and data lines, a pixel electrode connected with the thin film transistor, and a common electrode provided adjacent to the pixel electrode and supplied with a common voltage.

The upper substrate 620 may include a pixel defining pattern for defining an open area overlapped with each pixel formed on the lower substrate 610, and a color filter formed in the open area. The lower substrate 610 and the upper substrate 620 are bonded to each other with the liquid crystal layer interposed in-between by the use of sealant. The lower substrate 610 and the upper substrate 620 have the same size.

The liquid crystal layer is interposed between the lower substrate 610 and the upper substrate 620. The liquid crystal layer is formed of liquid crystal including liquid crystal molecules whose alignment is changed in accordance with the electric field formed by the data voltage applied to the pixel electrode and the common voltage applied to the common electrode every pixel.

A pad portion (PP) connected with each signal line is prepared at each lateral surface of the lower substrate 610 and the upper substrate 620 bonded to each other with the liquid crystal layer interposed in-between. The pad portion (PP) is connected with the panel driving circuit portion 700 by a side bonding process. The pad portion (PP) may include a data pad portion connected with the plurality of data lines, and a gate pad portion connected with the plurality of gate lines. The data pad portion is prepared in a first side of the display panel 600, for example, a first long side being parallel to the gate line. The gate pad portion is prepared in a second side of the display panel 600, for example, a first short side being parallel to the data line. According to one example of the present invention, the pad portion (PP) connected with a signal line is prepared at a lateral surface of the display panel 600. Accordingly, unlike a related art pad portion (PP), the pad portion (PP) of the present invention is not exposed to the front where a viewer is positioned, whereby it is unnecessary to provide a front case for covering the pad portion (PP), to thereby minimize a bezel width of the display apparatus.

The lower polarizing member 630 is attached to a rear surface of the lower substrate 610, wherein incident light, which is emitted from the backlight unit 500, is polarized in a first polarizing axis by the lower polarizing member 630, whereby the lower substrate 610 is irradiated with the light polarized by the lower polarizing member 630.

The upper polarizing member 640 is attached to a front surface of the upper substrate 620, wherein the upper polarizing member 640 polarizes light emitted to the external through the upper substrate 620. The upper polarizing member 640 according to one example may include a polarizing film, which is attached to the front surface of the upper substrate 620, for polarizing color light, which is emitted to the external through the upper substrate 620, in a second polarizing axis which is different from the first polarizing axis. The upper polarizing member 640 according to another example may include a polarizing film, and a retarder film attached to an upper surface of the polarizing film, wherein the retarder film includes a left-eye retarder pattern and a right-eye retarder pattern which are provided to separate a three-dimensional image displayed on the display panel 600, that is, to separate images seen through the left and right eyes into the different polarizing states.

The panel driving circuit portion 700 may include a data driving circuit portion 710, and a gate driving circuit portion 720.

The data driving circuit portion 710 is connected with the data pad portion (PP) prepared at the first lateral surface of the display panel 600, wherein the data driving circuit portion 710 supplies a data signal to each of the plurality of data lines. The data driving circuit portion 710 according to one example may include a plurality of data flexible circuit films 712, a plurality of data driving integrated circuits 714, and a data printed circuit board 716.

The plural data flexible circuit films 712 are respectively attached to the data pad portion (PP) prepared at the first lateral surface of the display panel 600, and are connected with the plurality of data lines. Each of the plurality of data flexible circuit films 712 is attached to the data pad portion (PP) by a side bonding method. An upper side in each of the plurality of data flexible circuit films 712 is supported by the panel support frame 300, for example, an outer side of the panel support sidewall 210 prepared in the first frame member 110, and a lower side in each of the plurality of data flexible circuit films 712 is bent from the upper side in each of the plurality of data flexible circuit films 712, and is received in the circuit receiving groove 216 of the main sidewall 210 prepared in the first frame member 110. In this case, an insulating film 717 may be provided between the first frame member 110 and the plurality of data flexible circuit films 712.

Each of the plurality of data driving integrated circuits 714 is mounted on the data flexible circuit film 712, wherein the data driving integrated circuit 714 receives data for each pixel and a data control signal from a timing controller through the data printed circuit board 716, converts the data for each pixel into an analog-type data signal in accordance with the data control signal, and supplies the analog-type data signal to the corresponding data line through the data pad portion (PP). Each of the plurality of data driving integrated circuits 714 may be disposed in the circuit receiving groove 216 of the main sidewall 210 prepared in the first frame member 110.

The data printed circuit board 716 is connected with the plurality of data flexible circuit films 714. The data printed circuit board 716 provides the data and signal, which are supplied from the timing controller, to the data driving integrated circuit 714. The data printed circuit board 716 may be disposed in the circuit receiving groove 216 of the main sidewall 210 prepared in the first frame member 110. In this case, an insulating pad 718 may be provided between the data printed circuit board 716 and the circuit receiving groove 216.

The gate driving circuit portion 720 is connected with a gate pad portion prepared at the second lateral surface of the display panel 600, wherein the gate driving circuit portion 720 supplies a gate signal to each of the plurality of gate lines. The gate driving circuit portion 720 according to one example may include plural gate flexible circuit films 722, plural gate driving integrated circuits 724, and a gate printed circuit board 726.

The plural gate flexible circuit films 722 are respectively attached to the gate pad portion (PP) prepared at the second lateral surface of the display panel 600, and are connected with the plurality of gate lines. Each of the plurality of gate flexible circuit films 722 is attached to the gate pad portion by a side bonding method. An upper side in each of the plurality of gate flexible circuit films 722 is supported by the panel support frame 300, for example, an outer side of the panel support sidewall 210 prepared in the second frame member 120, and a lower side in each of the plurality of gate flexible circuit films 722 is bent from the upper side in each of the plurality of gate flexible circuit films 722, and is received in the circuit receiving groove 216 of the main sidewall 210 prepared in the second frame member 120. In this case, an insulating film may be provided between the second frame member 120 and the plurality of gate flexible circuit films 722.

Each of the plurality of gate driving integrated circuits 724 is mounted on the gate flexible circuit film 722, wherein the gate driving integrated circuit 724 receives a gate control signal from a timing controller through the gate printed circuit board 726, generates a gate signal sequentially shifted in accordance with the gate control signal, and supplies the gate signal to the corresponding gate line through the gate pad portion. Each of the plurality of gate driving integrated circuits 724 may be disposed in the circuit receiving groove 216 of the main sidewall 210 prepared in the second frame member 120.

The gate printed circuit board 726 is connected with the plurality of gate flexible circuit films 724. The gate printed circuit board 726 provides the gate control signal, which is supplied from the timing controller, to the gate driving integrated circuit 724. The gate printed circuit board 726 may be disposed in the circuit receiving groove 216 of the main sidewall 210 prepared in the second frame member 120. In this case, an insulating pad may be provided between the gate printed circuit board 726 and the circuit receiving groove 216.

The timing controller is mounted on a control board which is connected with the data printed circuit board 716 and the gate printed circuit board 726. The timing controller receives digital video data and timing synchronization signal supplied from a display driving system circuit, generates data for each pixel by aligning the digital video data to be appropriate for a pixel alignment structure of the display panel 600 on the basis of the timing synchronization signal, and provides the generated data for each pixel to the data driving integrated circuit 714. Also, the timing controller generates the gate control signal and data control signal based on the timing synchronization signal, and controls driving timing of each of the data driving integrated circuit 714 and the gate driving integrated circuit 724.

Additionally, the timing controller controls the backlight unit 500 by a local dimming technology so that it is possible to individually control the luminance for each local area of the display panel 600.

Meanwhile, a gate driving circuit for supplying the gate (or scan) signal to the gate line may be provided in a non-display area at a long side of the lower substrate 610. The gate driving circuit to be connected with each gate line is manufactured for a process of manufacturing the thin film transistor for each pixel. In this case, it is possible to omit the gate driving circuit portion 720.

The panel driving circuit portion 700 is attached to the lateral surface of the display panel 600, and is then disposed in the circuit receiving groove 216 of the panel support frame 300, to thereby realize the minimum bezel width of the display apparatus.

Additionally, the display apparatus according to one embodiment of the present invention may further include a first cover shield 810, a second cover shield 820, and a lateral cover film 830.

The first cover shield 810 covers the elements included in the data driving circuit portion 710 disposed in the circuit receiving groove 216 of the panel support frame 300, and protects the data driving circuit portion 710 from external static electricity. Also, the first cover shield 810 presses the data printed circuit board 716 and the lower side in each of the plurality of data flexible circuit films 712 connected with the data printed circuit board 716, whereby the data printed circuit board 716 and the lower side in each of the plurality of data flexible circuit films 712 connected with the data printed circuit board 716 are received in the circuit receiving groove 216 prepared in the main sidewall 210 of the first frame member 110, so that it is possible to minimize the increase of bezel width by the data driving circuit portion 710. In this case, an insulating tape 719 may be provided between the first cover shield 810 and the lower side in each of the plurality of data flexible circuit films 712.

The second cover shield 820 covers the elements included in the gate driving circuit portion 720 disposed in the circuit receiving groove 216 of the panel support frame 300, and protects the gate driving circuit portion 720 from external static electricity. Also, the second cover shield 820 presses the gate printed circuit board 726 and the lower side in each of the plurality of gate flexible circuit films 722 connected with the gate printed circuit board 726, whereby the gate printed circuit board 726 and the lower side in each of the plurality of gate flexible circuit films 722 connected with the gate printed circuit board 726 are received in the circuit receiving groove 216 prepared in the main sidewall 210 of the second frame member 120, so that it is possible to minimize the increase of bezel width by the gate driving circuit portion 720. In this case, an insulating tape may be provided between the second cover shield 820 and the lower side in each of the plurality of gate flexible circuit films 722.

The lateral cover film 830 is prepared to cover each lateral surface of the display panel 600 and each outer lateral surface of the panel support frame 300. The lateral cover film 830 prevents external light from being incident on the inside of the display apparatus, and also prevents a light leakage which might occur in the connection portion of the display apparatus. Also, the lateral cover film 830 covers all lateral surfaces of the display apparatus, to thereby realize a good design of the display apparatus.

The display apparatus according to one embodiment of the present invention includes the panel support frame 300 comprising the frame for display according to the embodiment of the present invention so that it is possible to minimize the difference in height between each of the panel support sidewalls 220 prepared in the frame members 110, 120, 130, and 140 of the panel support frame 300, and to improve flatness in an upper surface of the panel support sidewall 220, thereby enabling an easy coating of the panel adhesive 600a for connecting the display panel 600 to the panel support sidewall 220. Also, in case of the display apparatus according to one embodiment of the present invention, the panel driving circuit portion 700 is attached to the lateral surface of the display panel 600, whereby the panel driving circuit portion 700 is disposed in the circuit receiving groove 216 of the panel support frame 300, and the panel driving circuit portion 700 is covered by the cover shields 810 and 820 and the lateral cover film 830, to thereby realize a good design of the display apparatus with the minimum bezel width.

Figure 15:
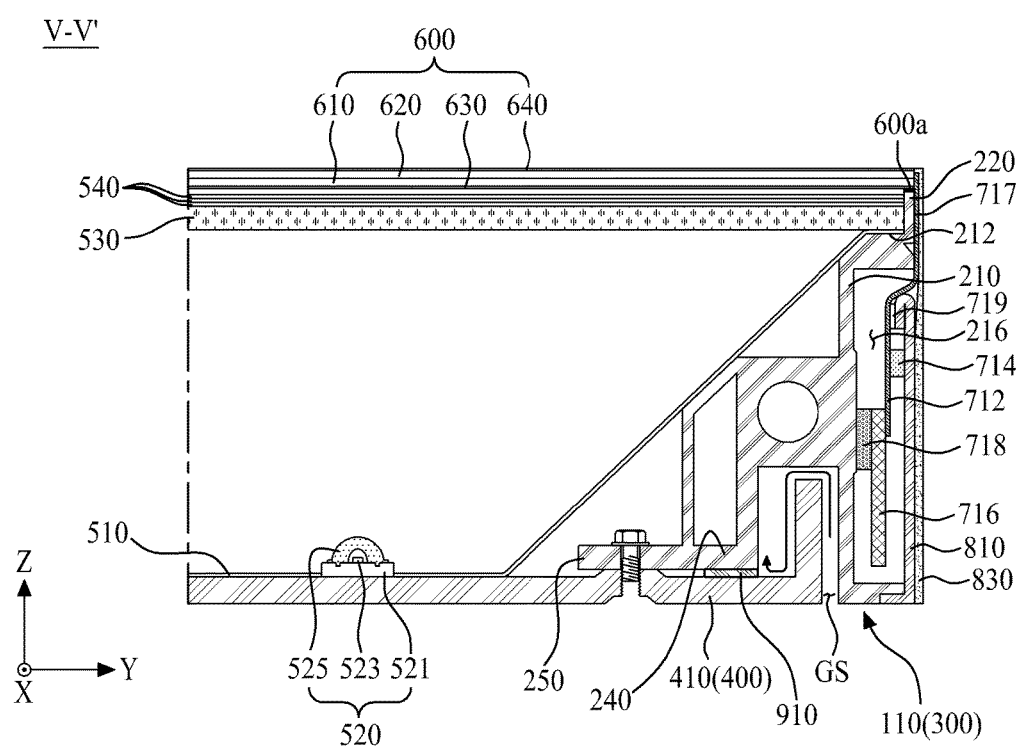
FIG. 15 illustrates a foreign matter preventing member in a display apparatus according to another embodiment of the present invention.

FIG. 15 illustrates a foreign matter preventing member in a display apparatus according to another embodiment of the present invention. This is obtained by additionally providing the foreign matter preventing member in the display apparatus according to one embodiment of the present invention. Accordingly, only the foreign matter preventing member will be described in detail, the same reference numbers will be used throughout the drawings to refer to the same or like parts except the foreign matter preventing member, and a repetitive description for the same parts will be omitted.

Referring to FIGS. 11, 12, and 15, the foreign matter preventing member 910 according to the present invention is provided between a rear cover 400 and each frame member 110, 120, 130, and 140 of a panel support frame 300, to thereby prevent a penetration path of foreign matter. That is, the foreign matter preventing member 910 may be disposed between a cover plate 410 of the rear cover 400 and an auxiliary sidewall 240 of each frame member 110, 120, 130, and 140, or may be disposed between the cover plate 410 of the rear cover 400 and a second support portion 250 of each frame member 110, 120, 130, and 140. The foreign matter preventing member 910 prevents foreign matter such as dust from being permeated into the inside of the display apparatus through a gap space (GS) between the rear cover 400 and the panel support frame 300, to thereby prevent inferior picture quality caused by the foreign matter.

Figure 16:
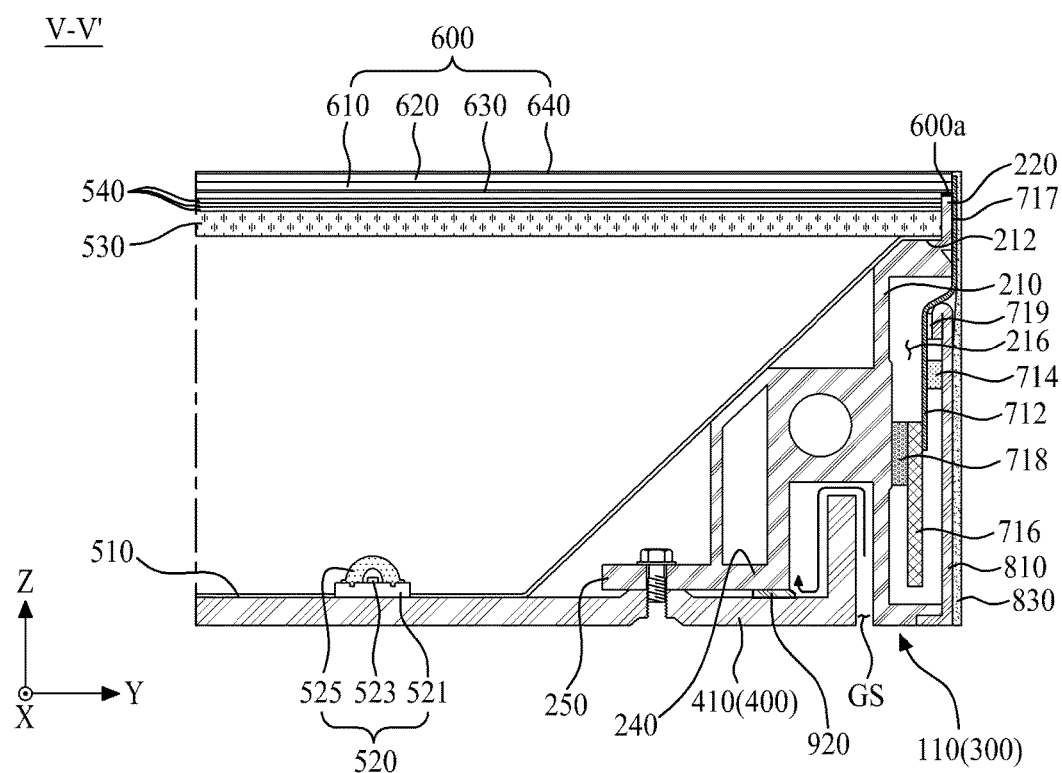
FIG. 16 illustrates a foreign matter preventing portion in a display apparatus according to another embodiment of the present invention.

FIG. 16 illustrates a foreign matter preventing portion in a display apparatus according to another embodiment of the present invention. This is obtained by additionally providing the foreign matter preventing portion in the display apparatus according to one embodiment of the present invention. Accordingly, only the foreign matter preventing portion will be described in detail, the same reference numbers will be used throughout the drawings to refer to the same or like parts except the foreign matter preventing portion, and a repetitive description for the same parts will be omitted.

Referring to FIGS. 11, 12, and 16, in the display apparatus according to another embodiment of the present invention, the foreign matter preventing portion 920 is provided in each frame member 110, 120, 130, and 140 of a panel support frame 300.

The foreign matter preventing portion 920 protrudes from an auxiliary sidewall 240 of each frame member 110, 120, 130, and 140 toward a rear cover 400, to thereby prevent a penetration path of foreign matter. That is, the foreign matter preventing portion 920 protrudes from a rear surface of the auxiliary sidewall 240 of each frame member 110, 120, 130, and 140 toward a cover plate 410 of the rear cover 400, to thereby seal a gap space between the auxiliary sidewall 240 and the cover plate 410. The foreign matter preventing portion 920 prevents foreign matter such as dust from being permeated into the inside of the display apparatus through a gap space (GS) between the rear cover 400 and the panel support frame 300, to thereby prevent inferior picture quality caused by the foreign matter.

Additionally, a sealing pad may be provided between the cover plate 410 and the foreign matter preventing portion 920.

As described above, the display apparatus according to the embodiments of the present invention includes the display panel with the liquid crystal layer, and the backlight unit, but not limited to this structure. The display apparatus according to the embodiments of the present invention may include an organic light emitting display panel or a plasma display panel. In this case, it is possible to realize a screen with a perfect flat structure with a minimized bezel width, and furthermore to realize a wall-mountable display apparatus or a tiled multi-display apparatus.

According to the frame for display of the present invention, the four frame members are connected in the diagonal connection structure so that it is possible to realize the stable rectangular shape, and to minimize the deformation on assembly by the restraint member prepared in each diagonal connection surface of the four frame members.

Also, it is possible to minimize the difference in height between each of the panel support sidewalls prepared in the four frame members, and to improve flatness in the upper surface of the panel support sidewall, thereby enabling the easy coating of the panel adhesive for connecting the display panel to the panel support sidewall.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A frame for display comprising:
   first to fourth frame members connected with each other so as to make a rectangular band shape,
   wherein each of the first to fourth frame members includes:
      a diagonal connection surface prepared at each of both ends; and
      a restraint member prepared in the diagonal connection surface,
   wherein the restraint member includes a restraint groove, and a restraint protrusion connected with the restraint groove, and
   wherein each of the first to fourth frame members further includes:
   a main sidewall having a first support portion prepared in its upper surface;
   a panel support sidewall vertically protruding from one edge of the first support portion;
   a coupling portion protruding from an inner surface of the main sidewall spaced from the first support portion, wherein the coupling portion has the restraint member;
   an auxiliary sidewall prepared in an inner surface of the coupling portion, wherein the auxiliary sidewall is parallel to the main sidewall; and
   a second support portion protruding from an inner surface of the auxiliary sidewall.

2. The frame according to claim 1, wherein an angle between the diagonal connection surface and an outer surface of at least one of the first to fourth frame members is less than 45°.

3. The frame according to claim 1, wherein the restraint protrusion protrudes from the diagonal connection surface of the first frame member, and the restraint groove is concavely prepared in the diagonal connection surface of the second frame member to be connected with the diagonal connection surface of the first frame member.

4. The frame according to claim 3, wherein a corner portion of the restraint protrusion is rounded with a first curvature and a corner portion of the restraint groove is rounded with a second curvature which is smaller than the first curvature.

5. The frame according to claim 3, further comprising:
   a first screw hole prepared in the restraint protrusion along a second horizontal axis direction;
   a second screw hole prepared in the restraint protrusion along a first horizontal axis direction, which crosses the second horizontal axis direction, on the same plane;
   a third screw hole prepared in the restraint groove along the second horizontal axis direction;
   a first connection member coupled with the third screw hole through the first screw hole; and a second connection member coupled with the second screw hole through a communication hole prepared in the second frame member, wherein the first and second connection members are provided to connect the diagonal connection surface of the first frame member and the diagonal connection surface of the second frame member with each other.

6. The frame according to claim 1, wherein, in the first and second frame members connected with each other through the diagonal connection surfaces, corner portions of both ends of the second support portion prepared in the first frame member are overlapped with both ends of the second support portion prepared in the second frame member.

7. A display apparatus comprising:
a display panel having a signal line;
a panel support frame comprising first to fourth frame members connected with each other so as to make a rectangular band shape for supporting a rear edge portion of the display panel; and
a rear cover having a cover plate for covering a rear surface of the panel support frame,
wherein each of the first to fourth frame members includes:
  a diagonal connection surface prepared at each of both ends; and
  a restraint member prepared in the diagonal connection surface,
wherein the restraint member includes a restraint groove, and a restraint protrusion connected with the restraint groove, and
wherein each of the first to fourth frame members further includes:
a main sidewall having a first support portion prepared in its upper surface;
a panel support sidewall, which is vertically protruding from one edge of the first support portion, connected with the rear edge portion of the display panel;
a coupling portion protruding from an inner surface of the main sidewall spaced from the first support portion, wherein the coupling portion has the restraint member;
an auxiliary sidewall prepared in an inner surface of a frame connection portion, wherein the auxiliary sidewall is parallel to the main sidewall; and
a second support portion, which is protruding from an inner surface of the auxiliary sidewall, connected with the cover plate.

8. The display apparatus according to claim 7, wherein the first and second frame members are connected with each other through the diagonal connection surfaces and corner portions of both ends of the second support portion prepared in the first frame member are overlapped with both ends of the second support portion prepared in the second frame member.

9. The display apparatus according to claim 7, wherein each of the first to fourth frame members further includes a foreign matter preventing portion which protrudes from the auxiliary sidewall toward the cover plate.

10. The display apparatus according to claim 7, further comprising a foreign matter preventing member disposed between the cover plate and each of the first to fourth frame members.

11. The display apparatus according to claim 7, further comprising:

a plurality of flexible circuit films connected with the signal line at a lateral surface of the display panel;
a driving integrated circuit mounted on each of the plurality of flexible circuit films; and
a printed circuit board connected with the plurality of flexible circuit films,
wherein the main sidewall of any one of the first to fourth frame members has a circuit receiving groove for receiving a lower side of each of the plurality of flexible circuit films and the printed circuit board.

12. The display apparatus according to claim 11, further comprising:
a cover shield for making the printed circuit board and the lower side of each of the plurality of flexible circuit films connected with the printed circuit board capable of being received in the circuit receiving groove; and
a lateral cover film for covering the lateral surface of the display panel, the panel support sidewall, the plurality of flexible circuit films, and the cover shield.

13. The display apparatus according to claim 7, further comprising:
a plurality of light source array modules disposed on the cover plate;
a diffusion plate supported on the first support portion so as to cover an upper side of each of the plurality of light source array modules; and
an optical sheet portion disposed on the diffusion plate.

14. The display apparatus according to claim 7, wherein an angle between the diagonal connection surface and an outer surface of at least one of the first to fourth frame members is less than 45°.

15. The display apparatus according to claim 7, wherein the restraint protrusion protrudes from the diagonal connection surface of the first frame member, and the restraint groove is concavely prepared in the diagonal connection surface of the second frame member to be connected with the diagonal connection surface of the first frame member.

16. The display apparatus according to claim 15, wherein a corner portion of the restraint protrusion is rounded with a first curvature and a corner portion of the restraint groove is rounded with a second curvature which is smaller than the first curvature.

17. The display apparatus according to claim 15, further comprising:
a first screw hole prepared in the restraint protrusion along a second horizontal axis direction;
a second screw hole prepared in the restraint protrusion along a first horizontal axis direction, which crosses the second horizontal axis direction, on the same plane;
a third screw hole prepared in the restraint groove along the second horizontal axis direction;
a first connection member coupled with the third screw hole through the first screw hole; and
a second connection member coupled with the second screw hole through a communication hole prepared in the second frame member,
wherein the first and second connection members are provided to connect the diagonal connection surface of the first frame member and the diagonal connection surface of the second frame member with each other.

* * * * *